United States Patent
Park et al.

(10) Patent No.: US 9,611,411 B2
(45) Date of Patent: Apr. 4, 2017

(54) RADICALLY CURABLE ADHESIVE COMPOSITION AND POLARIZING PLATE INCLUDING THE SAME

(71) Applicant: LG Chem, Ltd., Seoul (KR)

(72) Inventors: Kwang-Seung Park, Daejeon (KR); Mi-Rin Lee, Daejeon (KR); Eun-Mi Seo, Daejeon (KR); Eun-Soo Huh, Daejeon (KR); Yong-Il Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 396 days.

(21) Appl. No.: 14/389,176

(22) PCT Filed: Jun. 13, 2014

(86) PCT No.: PCT/KR2014/005230
§ 371 (c)(1),
(2) Date: Sep. 29, 2014

(87) PCT Pub. No.: WO2014/204142
PCT Pub. Date: Dec. 24, 2014

(65) Prior Publication Data
US 2016/0244644 A1  Aug. 25, 2016

(30) Foreign Application Priority Data

Jun. 18, 2013 (KR) .................. 10-2013-0069630
Jun. 3, 2014 (KR) .................. 10-2014-0067602

(51) Int. Cl.
| | | |
|---|---|---|
| C09J 4/00 | (2006.01) | |
| C09J 133/14 | (2006.01) | |
| G02B 5/30 | (2006.01) | |
| B32B 7/12 | (2006.01) | |
| G02B 1/14 | (2015.01) | |

(52) U.S. Cl.
CPC ............... C09J 133/14 (2013.01); B32B 7/12 (2013.01); G02B 1/14 (2015.01); G02B 5/3033 (2013.01); *B32B 2255/26* (2013.01); *B32B 2307/42* (2013.01); *C09J 4/00* (2013.01)

(58) Field of Classification Search
None
See application file for complete search history.

(56) References Cited

U.S. PATENT DOCUMENTS

| | | | |
|---|---|---|---|
| 6,013,722 A | 1/2000 | Yang et al. | |
| 8,242,225 B2 * | 8/2012 | Lee ............................ | C08J 5/18 349/96 |
| 8,968,862 B2 * | 3/2015 | Seo ........................ | G02B 5/305 428/216 |
| 9,250,358 B2 * | 2/2016 | Cho ........................... | C09J 4/00 |
| 9,442,223 B2 * | 9/2016 | Park ......................... | G02B 1/14 |
| 9,453,150 B2 * | 9/2016 | Park ......................... | C09J 133/14 |
| 9,487,685 B2 * | 11/2016 | Seo ........................ | C09J 163/00 |
| 9,550,918 B2 * | 1/2017 | Lee ............................ | C09J 4/00 428/176 |
| 2003/0134988 A1 | 7/2003 | Asano et al. | |
| 2009/0275718 A1 | 11/2009 | Um et al. | |
| 2013/0288048 A1 | 10/2013 | Toyama et al. | |

FOREIGN PATENT DOCUMENTS

| | | |
|---|---|---|
| CN | 101907737 A | 12/2010 |
| EP | 2314651 A1 | 4/2011 |
| JP | 49-114645 A | 11/1974 |
| JP | 60-219276 A | 11/1985 |
| JP | 2000-230016 | 8/2000 |
| JP | 2001-151814 | 6/2001 |
| JP | 2002-120326 | 4/2002 |
| JP | 4561936 B1 | 10/2010 |
| JP | 2011-076058 A | 4/2011 |
| JP | 2012-140579 | 7/2012 |
| KR | 10-2009-0115040 | 11/2009 |
| KR | 10-0973677 | 7/2010 |
| KR | 10-2012-0044236 | 5/2012 |
| WO | 2013/055015 | 4/2013 |

* cited by examiner

*Primary Examiner* — Sheeba Ahmed
(74) *Attorney, Agent, or Firm* — Dentons US LLP

(57) ABSTRACT

There are provided a radically curable adhesive composition and a polarizing plate including the radically curable adhesive composition. The radically curable adhesive composition includes, based on 100 parts by weight thereof, 40 to 80 parts by weight of a first compound represented by the following Formula 1; 15 to 50 parts by weight of a second compound including at least one carboxy group; and 0.5 to 10 parts by weight of a radical initiator.

15 Claims, No Drawings

RADICALLY CURABLE ADHESIVE COMPOSITION AND POLARIZING PLATE INCLUDING THE SAME

This application is a National Stage Entry of International Application No. PCT/KR2014/005230, filed Jun. 13, 2014, and claims the benefit of Korean Application No. 10-2013-0069630 filed on Jun. 18, 2013, and Korean Application No. 10-2014-0067602, filed Jun. 3, 2014, all of which are hereby incorporated by reference in their entirety for all purposes as if fully set forth herein.

TECHNICAL FIELD

The present disclosure relates to a radically curable adhesive composition and a polarizing plate including the radically curable adhesive composition.

BACKGROUND ART

Recent liquid crystal displays have features such as low power consumption, low operational voltages, light weight, and reduced thicknesses, and thus are used as various display devices. Liquid crystal displays are made up of many elements such as liquid crystal cells, a polarizing plate, a retardation film, a light collecting sheet, a diffusion film, a light guide plate, and a reflection sheet. Therefore, many efforts have been made to achieve objects such as productivity improvements, weight reductions, and brightness improvements by reducing the number or thicknesses of films or sheets.

Current polarizing plates have a stacked structure in which a protective film or protective films are attached to one or both surfaces of a polarizer formed of a polyvinyl alcohol (PVA)-based resin generally dyed with a dichroic dye or iodine, by an adhesive. In the related art, triacetyl cellulose (TAC)-based films have mainly been used as protective films for polarizing plates. However, TAC films are easily deformed in high-temperature, high-humidity environments. Therefore, protective films made of various materials have recently been developed to replace TAC films. For example, methods of using films such as polyethylene terephthalate (PET) films, cycloolefin polymer (COP) films, and acrylic films individually or in combination have been suggested.

Aqueous adhesives formed of PVA-based resin solutions have usually been used as adhesives for attaching protective films to polarizers.

However, if aqueous adhesives are used for protective films other than TAC films, such as acrylic films or COP films, the adhesiveness of the aqueous adhesives becomes poor. Therefore, the use of aqueous adhesives is limited to kinds of film materials. In addition to the poor adhesiveness of aqueous adhesives to some materials, if protective films formed of different materials are attached to both surfaces of a PVA device by using an aqueous adhesive, curling may appear on a polarizing plate after a drying process of the aqueous adhesive, and initial optical properties of the polarizing plate may be worsened. Furthermore, since aqueous adhesives inevitably require a drying process, the defect rate may be increased because of differences in water permeability and thermal expansion rates during the drying process. To address these problems, methods of using nonaqueous adhesives instead of aqueous adhesives have been proposed.

Nonaqueous adhesives may be classified into a radically curable type and a cationically curable type according to curing methods. Although cationically curable adhesives have high adhesiveness with respect to various films, the curing rate and curing degree thereof are low, and thus it is disadvantageous to use cationically curable adhesives in a manufacturing process.

Therefore, the development of radically curable adhesives having high adhesiveness, high curing rates, and high curing degrees is needed to solve the above-mentioned problems.

DISCLOSURE

Technical Problem

Aspects of the present disclosure may provide a radically curable adhesive composition having high water resistance and high heat resistance in addition to high adhesive with respect to a polarizer and an acrylic protective film, and a polarizing plate including the radically curable adhesive composition.

Technical Solution

According to an aspect of the present disclosure, a radically curable adhesive composition may include, based on 100 parts by weight thereof, 40 to 80 parts by weight of a first compound represented by the following Formula 1; 15 to 50 parts by weight of a second compound including at least one carboxy group; and 0.5 to 10 parts by weight of a radical initiator,

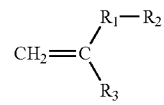

[Formula 1]

where $R_1$ may be an ester group or an ether group, $R_2$ may be a $C_{1-10}$ alkyl group including at least one hydroxy substituent or a $C_{4-10}$ cycloalkyl group including at least one hydroxy substituent, and $R_3$ may be hydrogen or a C1-10 alkyl group.

The radically curable adhesive composition may include 50 to 70 parts by weight of the first compound, 20 to 40 parts by weight of the second compound, and 0.5 to 10 parts by weight of the radical initiator, based on 100 parts by weight the radically curable adhesive composition.

The radically curable adhesive composition may further include, as a third compound, an acrylic monomer having a ring structure with a carbon number of 7 to 20. For example, the radically curable adhesive composition may include, as a third compound, an acrylic monomer having a ring structure with a carbon number of 7 to 15. In this case, the radically curable adhesive composition may include 40 to 80 parts by weight of the first compound, 15 to 50 parts by weight of the second compound, 1 to 50 parts by weight of the third compound, and 0.5 to 10 parts by weight of the radical initiator, based on 100 parts by weight the radically curable adhesive composition.

For example, the first compound may include at least one selected from the group consisting of compounds represented by the following Formulas 2 to 11:

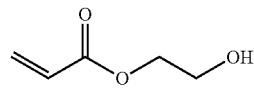

[Formula 2]

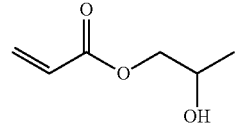

[Formula 3]

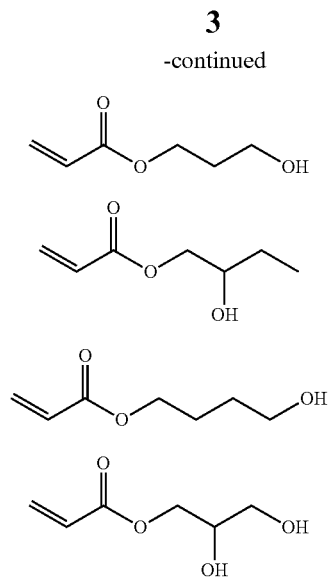
[Formula 4]
[Formula 5]
[Formula 6]
[Formula 7]
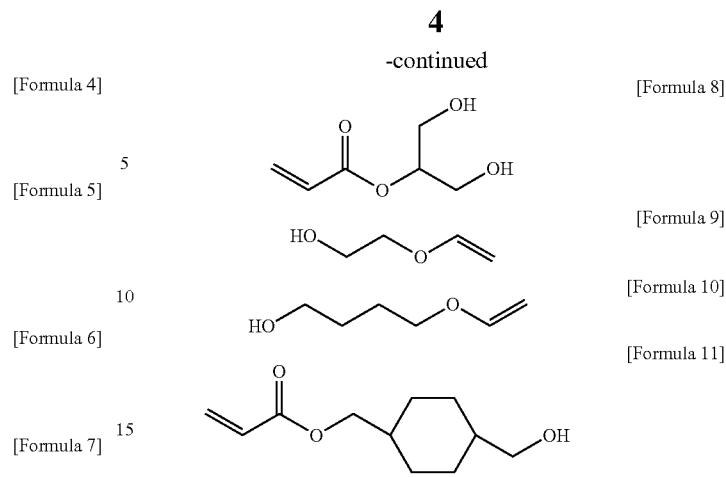
[Formula 8]
[Formula 9]
[Formula 10]
[Formula 11]
For example, the second compound may include at least one selected from the group consisting of compounds represented by the following Formulas 12 to 26:
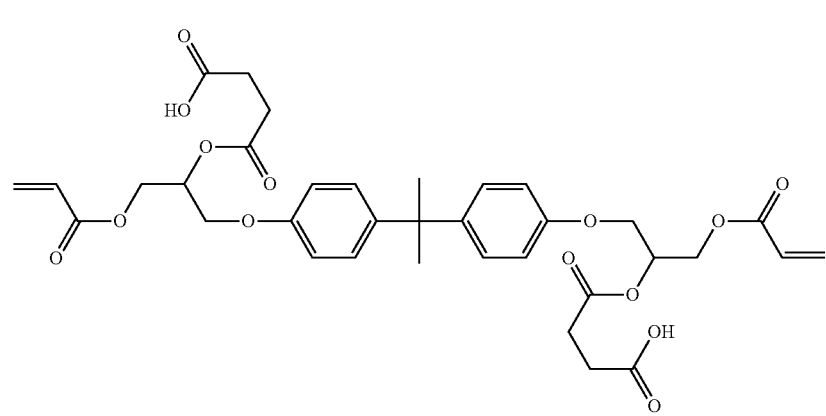
[Formula 12]
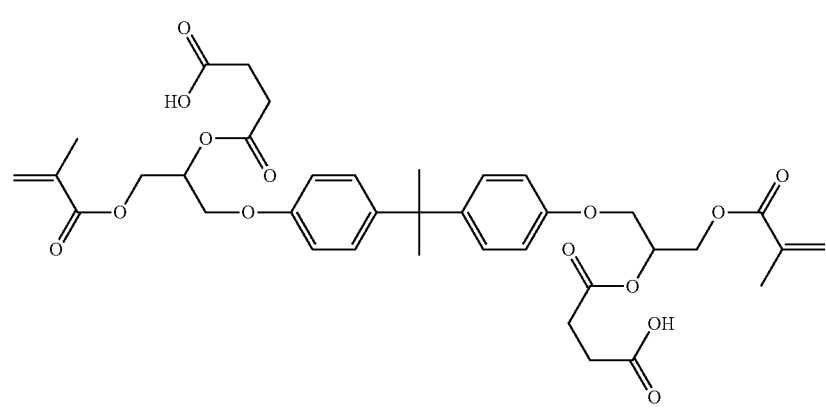
[Formula 13]
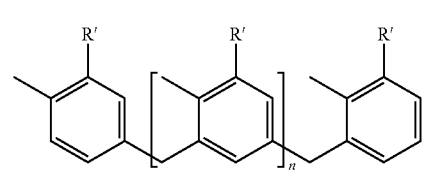
[Formula 14]

where R' is
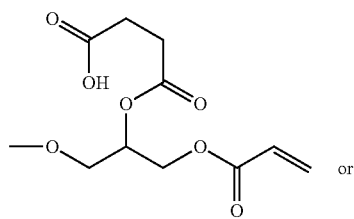
or
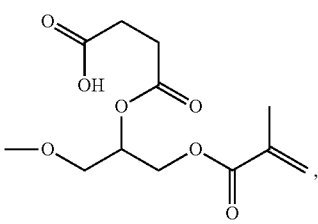
and n is an integer ranging from 1 to 5
[Formula 15]
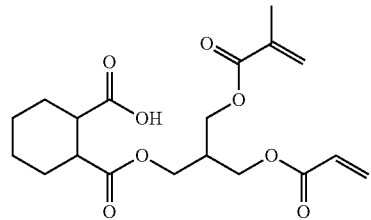
[Formula 16]
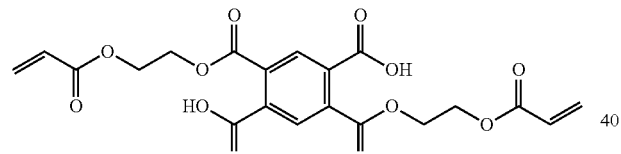
[Formula 17]
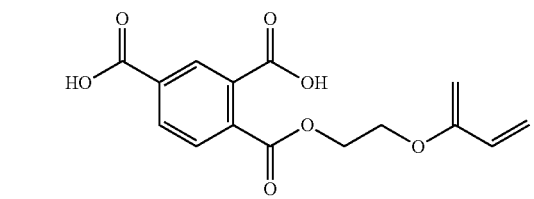
[Formula 18]
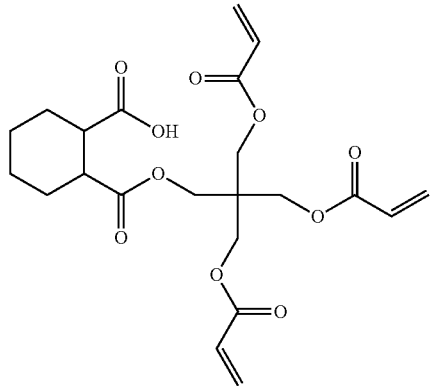
[Formula 19]
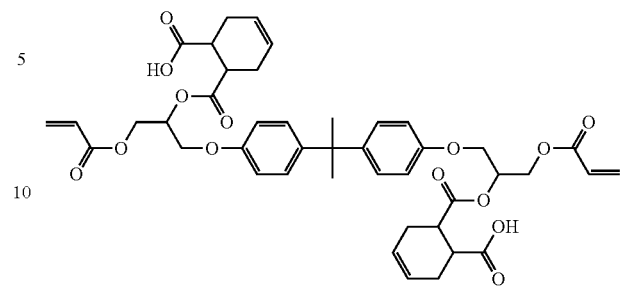
[Formula 20]
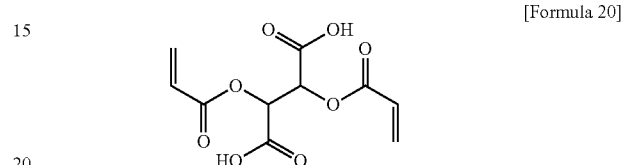
[Formula 21]
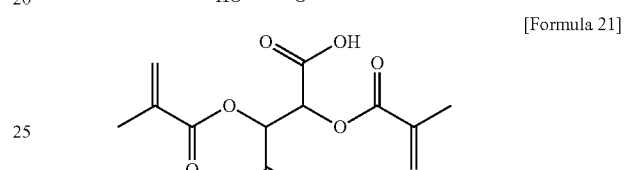
[Formula 22]
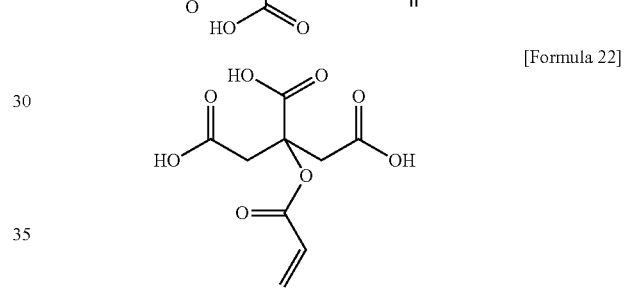
[Formula 23]
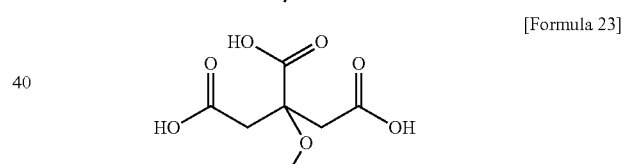
[Formula 24]
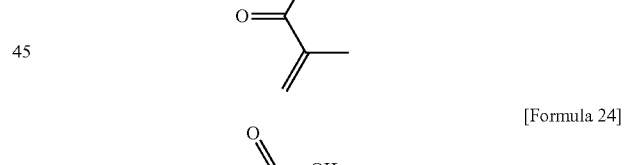
[Formula 25]
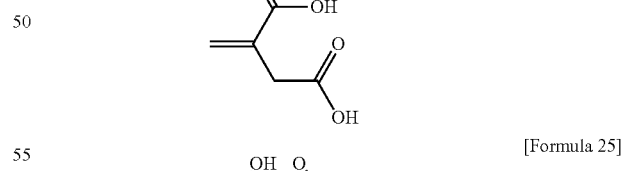
[Formula 26]
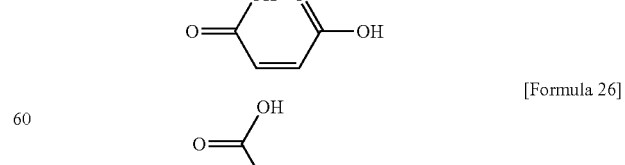

The second compound may have an acidity of about 100 to about 1,000 KOH mg/g.

For example, the third compound may include at least one selected from the group consisting of isobornyl (meth)acrylate, norbornyl (meth)acrylate, dicyclopentanyl (meth)acrylate, dicyclopentenyl (meth)acrylate), and 1-adamantyl-(meth)acrylate.

If necessary, the radically curable adhesive composition may further include a cationic initiator. In this case, the cationic initiator may be included in an amount of about 0.1 to about 10 parts by weight based on 100 parts by weight of the radically curable adhesive composition.

For example, the cationic initiator may include at least one selected from the group consisting of hexafluoroantimonate, diphenyl(4-phenylthio)phenylsulfonium hexafluorophosphate, (phenyl)[4-(2-methylpropyl) phenyl]-iodonium hexafluorophosphate, (thiodi-4,1-phenylene)bis(diphenylsulfonium) dihexafluoroantimonate, and (thiodi-4,1-phenylene)bis(diphenylsulfonium) dihexafluorophosphate.

The radically curable adhesive composition may have an acidity of about 30 to about 300 mg KOH/g, a viscosity of about 10 to about 300 cP, and a glass transition temperature of 70° C. or higher after being cured.

According to another aspect of the present disclosure, a polarizing plate may include: a polarizer; an adhesive layer formed on at least one surface of the polarizer; and an acrylic protective film formed on the adhesive layer, wherein the adhesive layer may be formed of the radically curable adhesive composition.

Advantageous Effects

The radically curable adhesive composition of the present disclosure has high water resistance and high heat resistance in addition to high adhesiveness with reference to the polarizer and the protective film.

Furthermore, since the radically curable adhesive composition of the present disclosure has a high curing rate and a high curing degree, productivity may be improved.

BEST MODE

Embodiments of the present disclosure will now be described in detail. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

A radically curable adhesive composition of the present disclosure includes: a first compound represented by the following Formula 1; a second compound including at least one carboxy group; and a radical initiator.

[Formula 1]

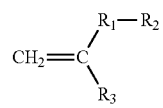

In Formula 1, $R_1$ is an ester group or an ether group, $R_2$ is a $C_{1-10}$ alkyl group or $C_{4-10}$ cycloalkyl group including at least one hydroxy substituent, and $R_3$ is hydrogen or a $C_{1-10}$ alkyl group. In $R_2$, the alkyl group may be linear or branched alkyl, and the hydroxy substituent may be located at an arbitrary position of the alkyl group or the cycloalkyl group. For example, the hydroxy substituent may be located on an end of the alkyl group or in the middle of the alkyl group.

The first compound functions as an adhesive ingredient, and various compounds represented by Formula 1 may be used as the first compound. In the present disclosure, specifically, the first compound may include at least one compound selected from compounds represented by the following Formulas 2 to 11, or may be prepared by mixing at least two selected from the compounds represented by the following Formulas 2 to 11. However, the first compound is not limited thereto. If the first compound is prepared by mixing at least two compounds, the first compound may be prepared by mixing at least one selected from the compounds represented by Formulas 9 and 10 with at least one selected from the compounds represented by Formulas 2 to 8 and 11.

[Formula 2]

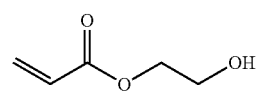

[Formula 3]

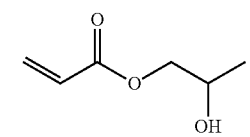

[Formula 4]

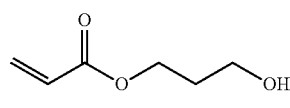

[Formula 5]

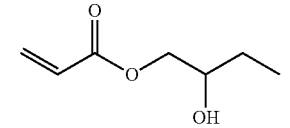

[Formula 6]

[Formula 7]

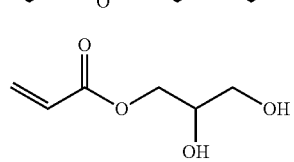

[Formula 8]

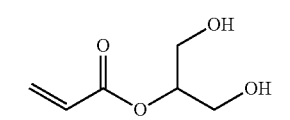

[Formula 9]

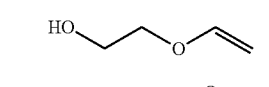

[Formula 10]

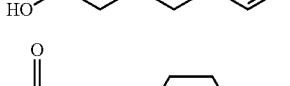

[Formula 11]

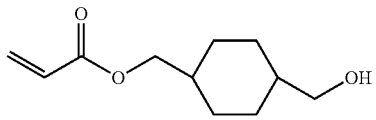

The content of the first compound may range from 40 parts by weight to 80 parts by weight, from 50 parts by weight to 80 parts by weight, or from 50 parts by weight to 70 parts by weight, based on 100 parts by weight of the radically curable adhesive composition. If the content of the first compound is within the above-mentioned range, adhesiveness may be stably maintained even in high-temperature, high-humidity conditions.

The second compound improves heat resistance and viscosity characteristics of the radically curable adhesive composition and includes at least one carboxy group. In detail, the second compound may include at least one selected from compounds represented by the following Formulas 12 to 26. For example, the second compound may be prepared by mixing at least two selected from the compounds represented by the following Formulas 12 to 26. If the second compound is prepared by mixing at least two compounds, the second compound may be prepared by mixing at least one selected from the compounds represented by Formulas 12 to 14 with at least one selected from the compounds represented by Formulas 20 to 26.

[Formula 12]

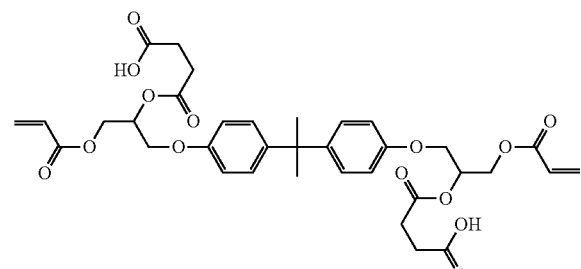

[Formula 13]

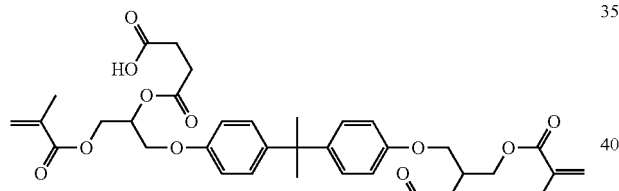

[Formula 14]

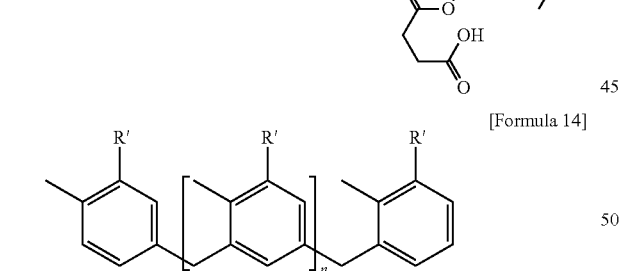

Where R' is

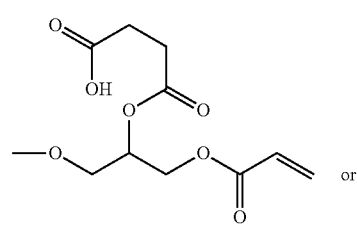 or

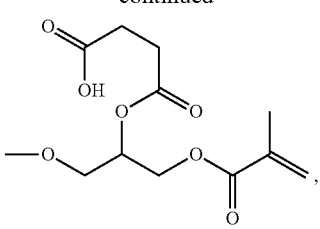

and n is an integer ranging from 1 to 5

[Formula 15]

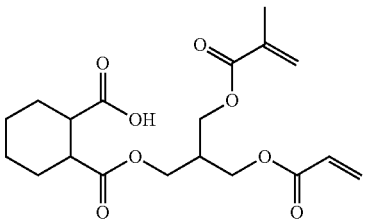

[Formula 16]

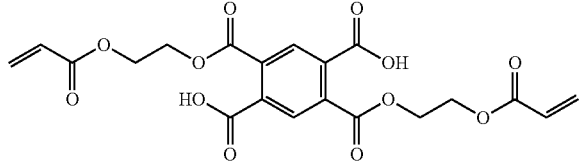

[Formula 17]

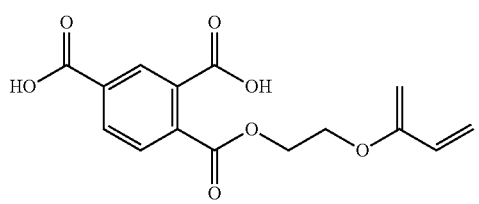

[Formula 18]

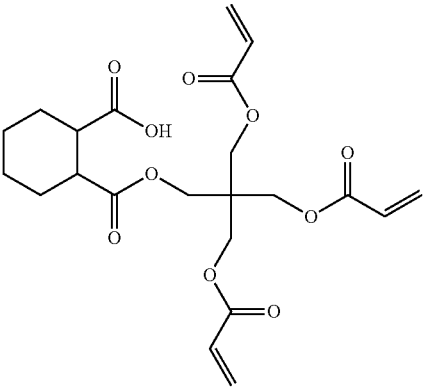

[Formula 19]

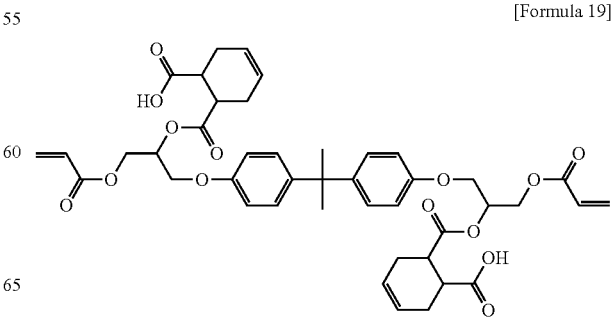

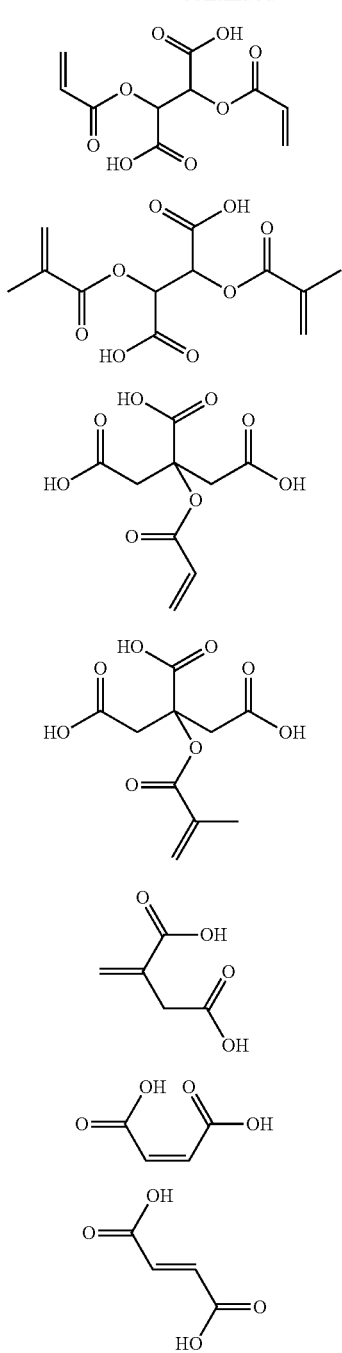

[Formula 20]

[Formula 21]

[Formula 22]

[Formula 23]

[Formula 24]

[Formula 25]

[Formula 26]

Preferably, the second compound may have an acidity of 100 to 1,000 KOH mg/g. For example, the second compound may have an acidity of about 100 to about 300 KOH mg/g or about 300 to about 900 KOH mg/g. If the acidity of the second compound is within the range, the radically curable adhesive composition may have an increased glass transition temperature without a decrease in adhesiveness to a polarizer, and thus the radically curable adhesive composition may have high heat resistance. Herein, the acidity refers to the amount of KOH in milligrams (mg) necessary to fully neutralize 1 g of a sample.

In addition, it may be preferable that the second compound be a homopolymer having a glass transition temperature of 60° C. or higher. If the radically curable adhesive composition includes only the first compound, although the radically curable adhesive composition has high adhesiveness, the heat resistance thereof may be low due to a low glass transition temperature. However, if the radically curable adhesive composition includes the first compound and the second compound having a glass transition temperature of 60° C. or higher, the heat resistance and water resistance of the radically curable adhesive composition may be further improved.

Preferably, the content of the second compound may range from about 15 parts by weight to about 50 parts by weight based on 100 parts by weight of the radically curable adhesive composition. For example, the content of the second compound may range from about 20 parts by weight to about 50 parts by weight or from about 20 parts by weight to about 40 parts by weight based on 100 parts by weight of the radically curable adhesive composition. If the content of the second compound is within the above-mentioned range, the radically curable adhesive composition may have high adhesiveness to a polarizer and high heat resistance as well.

In addition, the radically curable adhesive composition of the present disclosure may further include, as a third compound, an acrylic monomer having a ring structure with a carbon number of 7 to 20, preferably, 7 to 15. For example, specifically, third compound may include at least one selected from the group consisting of isobornyl (meth)acrylate, norbornyl (meth)acrylate, dicyclopentanyl (meth)acrylate, dicyclopentenyl (meth)acrylate), and 1-adamantyl-(meth)acrylate). However, the third compound is not limited thereto.

The content of the third compound may be 50 parts by weight or less based on 100 parts by weight of the radically curable adhesive composition. For example, it may be preferable that the content of the third compound range from 1 part by weight to 50 parts by weight or from 5 parts by weight to 50 parts by weight based on 100 parts by weight of the radically curable adhesive composition. If the content of the third compound is within the above-mentioned range, the viscosity of the radically curable adhesive composition may be improved, and the glass transition temperature of the radically curable adhesive composition may be improved after curing.

In detail, the radically curable adhesive composition may include 40 parts by weight to 80 parts by weight of the first compound, 15 parts by weight to 50 parts by weight of the second compound, 1 part by weight to 50 parts by weight of the third compound, and 0.5 parts by weight to 10 parts by weight of the radical initiator, based on 100 parts by weight the radically curable adhesive composition.

In the present disclosure, the radical initiator is included in the radically curable adhesive composition to facilitate radical polymerization and thus to increase the rate of cure. The radical initiator may be any material generally used as a radical initiator in the related art. For example, the radical initiator may include at least one selected from the group consisting of 1-Hydroxy-cyclohexyl-phenyl-ketone, 2-hydroxy-2-methyl-1-phenyl-1-propanone, 2-Hydroxy-1-[4-(2-hydroxyethoxy) phenyl]-2-methyl-1-propanone, methylbenzoylformate, oxy-phenyl-acetic acid-2-[2 oxo-2phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-Benzyl-2-(dimethylamino)-1-[4-(4-morpholinyl) phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide, and phenyl bis (2,4,6-trimethyl benzoyl). In the present disclosure, particularly, the radical initiator may include at least one of phosphine oxide and phenyl bis (2,4,6-trimethyl benzoyl).

Preferably, the content of the radical initiator may range from 0.5 parts by weight to 10 parts by weight, from 1 part by weight to 5 parts by weight, or from 2 parts by weight to 3 parts by weight, based on 100 parts by weight of the radically curable adhesive composition. If the content of the radical initiator is within the range, the radically curable adhesive composition may be easily cured.

In the present disclosure, if necessary, the radically curable adhesive composition may further include a cationic initiator.

Since the cationic initiator generates acid ($H^+$) when exposed to active energy rays, the acidity of the radically curable adhesive composition may be controlled using the cationic initiator so as to improve the adhesiveness of the radically curable adhesive composition. For example, the cationic initiator may include a sulfonium salt or an iodonium salt.

In detail, the cationic initiator including the sulfonium salt or the iodonium salt may include at least one selected from the group consisting of diphenyl(4-phenylthio)phenylsulfonium hexafluoroantimonate, diphenyl(4-phenylthio)phenylsulfonium hexafluorophosphate, (phenyl)[4-(2-methylpropyl) phenyl]-Iodonium hexafluorophosphate, (Thiodi-4,1-phenylene)bis(diphenylsulfonium) dihexafluoroantimonate, and (Thiodi-4,1-phenylene)bis(diphenylsulfonium)dihexafluorophosphate. However, the cationic initiator is not limited thereto.

The content of the cationic initiator may be 10 parts by weight or less based on 100 parts by weight of the radically curable adhesive composition. Preferably, the content of the cationic initiator may range from 0.1 parts by weight to 10 parts by weight, from 1 part by weight to 6 parts by weight, or 3 parts by weight to 5 parts by weight, based on 100 parts by weight of the radically curable adhesive composition. In the present disclosure, if the content of the cationic initiator in the radically curable adhesive composition is within the above-mentioned range, the adhesiveness of the radically curable adhesive composition may be improved as compared with the case in which the radically curable adhesive composition does not include the cationic initiator or the content of the cationic initiator is outside of the above-mentioned range.

In the present disclosure, for example, the acidity of the radically curable adhesive composition may range from 30 to 300 mg KOH/g, from 30 to 100 mg KOH/g, or from 100 to 300 mg KOH/g. In the present disclosure, if the acidity of the radically curable adhesive composition, the glass transition temperature (Tg) of the radically curable adhesive composition may be improved while maintaining the adhesiveness of the radically curable adhesive composition, and thus a polarizing plate having high heat resistance may be manufactured using the radically curable adhesive composition.

Preferably, the radically curable adhesive composition of the present disclosure may have a glass transition temperature within the range of about 70° C. to about 500° C. after being cured. For example, the radically curable adhesive composition may have a glass transition temperature within the range of 80° C. to 300° C. or 90° C. to 200° C. In the present disclosure, if a polarizing plate is manufactured using the radically curable adhesive composition having a glass transition temperature within the above-mentioned range, the polarizing plate may have high heat resistance and water resistance.

In addition, preferably, the radically curable adhesive composition of the present disclosure may have a viscosity within the range of about 10 cP to about 300 cP or about 20 cP to about 100 cP. If the radically curable adhesive composition has viscosity within the range, a thin adhesive layer may be formed of the radically curable adhesive composition, and processability may be improved owing to low viscosity.

In addition, the adhesive layer formed of the radically curable adhesive composition may have a thickness of 0.1 μm to 20 μm or 0.5 μm to 5 μm. If the thickness of the adhesive layer is within the range, a polarizing plate having high heat resistance may be manufactured using the radically curable adhesive composition.

As described above, since the radically curable adhesive composition has high adhesiveness with respect to various films, high water resistance, and high heat resistance, a polarizing plate manufactured using the radically curable adhesive composition may have superior characteristics.

Furthermore, since the radically curable adhesive composition of the present disclosure has a high curing rate and a high curing degree, the productivity of a polarizing plate manufacturing process may be improved.

In addition, a polarizing plate of the present disclosure includes: a polarizer; a radically cured adhesive layer formed on at least one surface of the polarizer; and an acrylic protective film formed on the adhesive layer, wherein the adhesive layer is formed of the radically curable adhesive composition.

The polarizer is not limited to a particular type. A polarizer well known in the related art, such as a polyvinyl alcohol (PVA) film including an iodine or dichroic die, may be used as the polarizer. The polarizer may be formed by dyeing a PVA film with an iodine or dichroic die. However, the polarizer is not limited thereto. In the present disclosure, the term "polarizer" refers to a polarizer not including a protective film, and the term "polarizing plate" refers to a polarizing plate including a polarizer and a protective film.

The radically cured adhesive layer is formed of the above-described radically curable adhesive composition of the present disclosure, and a method known in the related art may be used to form the radically cured adhesive layer. For example, the adhesive layer may be formed by applying the radically curable adhesive composition to one surface of the acrylic protective film, bringing the polarizer and the acrylic protective film into contact with each other, and curing the radically curable adhesive composition with active energy rays.

The acrylic protective film formed on the adhesive may include a (meth)acrylate-based resin. For example, a film including a (meth)acrylate-based resin may be obtained by extruding a film formation material including a (meth)acrylate-based resin as a main ingredient.

The acrylic protective film may include a copolymer having an alkyl(meth)acrylate unit and a styrene unit, and an aromatic resin having a carbonate moiety in the main chain. Alternatively, the acrylic protective film may include an alkyl(meth)acrylate unit, a styrene unit, a 3- to 6-membered heterocyclic unit substituted with at least one carbonyl group, and a vinyl cyanide unit.

Alternatively, the acrylic protective film may include a (meth)acrylate-based resin having an aromatic ring. As an example of the (meth)acrylate-based resin having an aromatic ring, a resin composition is disclosed in Korean Patent Application Laid-open Publication No.: 10-2009-0115040. The disclosed resin composition includes: (a) a (meth)acrylate unit including at least one (meth)acrylate derivative;

(b) an aromatic unit including a chain having a hydroxyl-containing moiety and an aromatic moiety; and (c) a styrene unit including at least one styrene derivative. The units (a) to (c) may be included in the resin composition as separate copolymers, or two or more of the units (a) to (c) may be included in the resin composition as a copolymer.

Alternatively, the acrylic protective film may include an acrylic resin having a lactone ring structure. Examples of a (meth)acrylate-based resin having a lactone ring structure are disclosed in Japanese Patent Application Laid-open Publication Nos. 2000-230016, 2001-151814, and 2002-120326.

The acrylic protective film may be formed by any method. For example, materials such as a (meth)acrylate-based resin, a polymer, and an additive may be fully mixed by an appropriate method to form a thermoplastic resin composition, and a film may be formed of the thermoplastic resin composition. In another example, solutions such as a (meth)acrylate-based resin solution, a polymer solution, and an additive solution may be individually prepared and mixed with each other to obtain a uniform solution mixture, and a film may be formed using the uniform solution mixture.

The thermoplastic resin composition may be obtained by: pre-blending the above-described raw materials using an appropriate mixer such as an omni-mixer; and kneading and extruding the mixture. The mixture may be kneaded and extruded by any mixer. For example, an extruder such as a uniaxial extruder or a biaxial extruder, or a pressure kneader may be used.

In the above, an appropriate film forming method such as a solution casting method, a melting extrusion method, a calendaring method, or a compressing method may be used. For example, the solution casting method or the melting extrusion method may be used.

Examples of a solvent that may be used in the solution casting method include: aromatic hydrocarbons such as benzene, toluene, and xylene; aliphatic hydrocarbons such as cyclohexane and decalin; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethylformamide; and dimethyl sulfoxide. The listed solvents may used individually or in combination.

The solution casting method may be performed by using a device such as a drum casting machine, a band casting machine, or a spin coater. Examples of the melting extrusion method may include a T-die method and an inflation method. Such a film formation method may preferably be performed at 150° C. to 350° C., more preferably at 200° C. to 300° C.

In the case of forming a film using the T-die method, a T-die may be disposed on a leading end of a well-known uniaxial or biaxial extruder, and an extruded film may be rolled into a roll. In this case, the temperature of a roll may be properly controlled so that the film may be stretched (oriented) in an extrusion direction (uniaxial stretching). In addition, simultaneous or sequential orientation may be performed by simultaneously or sequentially orienting the film in a direction perpendicular to the extrusion direction.

The acrylic protective film may be a non-stretched (non-oriented) film or an oriented film. In the latter case, the acrylic protective film may be a uniaxially oriented film or a biaxially oriented film. If the acrylic protective film is a biaxially oriented film, the acrylic protective film may a simultaneously biaxially oriented film or a sequentially biaxially oriented film. If the acrylic protective film is a biaxially oriented film, the quality of the acrylic protective film may be improved owing to improved mechanical strength. If the acrylic protective film includes a thermoplastic resin, although the acrylic protective film is oriented, the phase difference of the acrylic protective film may not be increased, and the optical isotropy of the acrylic protective film may be maintained.

The acrylic protective film may be oriented at a temperature around the glass transition temperature of the thermoplastic resin composition, preferably at a temperature of (glass transition temperature–30° C.) to (glass transition temperature+100° C.), more preferably at a temperature of (glass transition temperature–20° C.) to (glass transition temperature+80° C.). If the orientation temperature is lower than (glass transition temperature–30° C.), a sufficient orientation ratio may not be obtained. On the other hand, if the orientation temperature is higher than (glass transition temperature+100° C.), the thermoplastic resin composition may flow, and thus orientation may not be stably performed.

An area orientation ratio of the acrylic protective film may preferably be within the range of 1.1 to 25, more preferably within 1.3 to 10. If the area orientation ratio is lower than 1.1, although the acrylic protective film is oriented, the toughness of the acrylic protective film may not be improved. If the area orientation ratio is higher than 25, orientation effects may not be further obtained.

An orientation rate may be preferably within 10%/min to 20,000%/min, more preferably within 100%/min to 10,000%/min. If the orientation rate is lower than %/min, it may take a long period of time to obtain a sufficient orientation ratio, and thus manufacturing costs may be increased. If the orientation rate is higher than 20,000%/min, the acrylic protective film may be fractured during orientation.

After the acrylic protective film is oriented, the acrylic protective film may be heat-treated (annealed) for stabilizing optical isotropic and mechanical characteristics thereof. Conditions for the heat treatment are not limited. For example, the heat treatment may be performed in proper conditions known in the related art.

In addition, the acrylic protective film may be surface-treated for improving adhesiveness. For example, at least one selected from the group consisting of alkali treatments, corona treatments, and plasma treatments may be performed on at least one surface of the optical film.

The polarizing plate of the present disclosure may be usefully used in an optical device such as a liquid crystal display. For example, the optical device may be an liquid crystal display including an liquid crystal panel and polarizing plates disposed on both sides of the liquid crystal panel, and at least one of the polarizing plates may be the polarizing plate of the present disclosure. In this case, the liquid crystal panel is not limited to a particular type thereof. Examples of the liquid crystal panel include: passive matrix panels such as twisted nematic (TN) panels, super twisted nematic (STN) panels, ferroelectric (F) panels, or polymer dispersed (PD) panels; active matrix panels such as two terminal panels or three terminal panels; in-plane switching (IPS) panels; and vertical alignment (VA) panels. However, the liquid crystal panel is not limited to such well-known panels. In addition, other structures of the liquid crystal display, such as upper and lower substrates (e.g., color filter substrates or array substrates), are not limited. For example, the other structures of the liquid crystal panel may be structures well known in the related art.

While exemplary embodiments have been shown and described above, it will be apparent to those skilled in the art that modifications and variations could be made without departing from the spirit and scope of the present disclosure as defined by the appended claims.

MODE FOR INVENTION

Hereinafter, embodiments of the present disclosure will be described in detail through examples.

Manufacturing Example 1

Acrylic Protective Film Manufacturing

A resin composition prepared by uniformly mixing poly(N-cyclohexyl maleimide-co-methyl methacrylate), a copolymer of styrene-maleic anhydride, and a phenoxy resin at a weight ratio of 100:2.5:5 was supplied to a 24ϕ extruder in a state in which a region from a raw-material hopper to the 24ϕ extruder was filled with nitrogen so as to melt the resin composition at 250° C. and extrude the resin composition as pellets.

The phenoxy resin was PKFE (Mw=60,000, Mn=16,000, Tg=95° C.) by InChemRez®, the copolymer of styrene-maleic anhydride was Dylaeck 332 including 85 wt % styrene and 15 wt % maleic anhydride, and the poly(N-cyclohexyl maleimide-co-methyl methacrylate) was measured by NMR analysis as including 6.5 wt % N-cyclohexyl maleimide.

After the pellets obtained as described above was dried in a vacuum, the pellets was melted using an extruder at 260° C. and passed through a coat hanger type T-die, chromium-coated casting rolls, and drying rolls, so as to form a 150-μm film. The film was stretched (oriented) at 125° C. to a stretching percentage of 170% in an MD direction by using a roll speed difference in a stretching machine. As a result, an acrylic film was manufactured.

The acrylic film manufactured as described above was treated with corona. Thereafter, a primer composition prepared by adding 20 parts by weight of an oxazoline cross-linking agent (by Niho Catalyst) to a composition having a solid content of 10 wt % prepared by diluting CK-PUD-F (Chokwang urethane dispersion) with pure water was coated on one surface of the acrylic film using bar #7. Then, the acrylic film was stretched (oriented) at 130° C. to a stretching percentage of 190% in a TD direction by using a tenter. As a result, an acrylic protective film having a primer layer thickness of 400 nm was manufactured.

Manufacturing Example 2

Adhesive Composition A

Adhesive composition A was prepared by mixing 67 parts by weight of 2-hydroxyethyl acrylate (Formula 2), 20 parts by weight of carboxylated BPA dimethacrylate (Formula 13), 10 parts by weight of itaconic acid (Formula 24), and 3 parts by weight of Irgacure 819 (radical initiator), and agitating the mixture at 60° C. for 4 hours.

Manufacturing Example 3

Adhesive Composition B

Adhesive composition B was prepared by mixing 67 parts by weight of 4-hydroxybutyl acrylate (Formula 6), 20 parts by weight of carboxylated BPA dimethacrylate (Formula 13), 10 parts by weight of itaconic acid (Formula 24), and 3 parts by weight of Irgacure 819 (radical initiator), and agitating the mixture at 60° C. for 4 hours.

Manufacturing Example 4

Adhesive Composition C

Adhesive composition C was prepared by mixing 67 parts by weight of hydroxyisopropyl acrylate (Formula 3), 20 parts by weight of carboxylated BPA type dimethacrylate (Formula 13), 10 parts by weight of itaconic acid (Formula 24), and 3 parts by weight of Irgacure 819 (radical initiator), and agitating the mixture at 60° C. for 4 hours.

Manufacturing Example 5

Adhesive Composition D

Adhesive composition D was prepared by mixing 67 parts by weight of 4-hydroxymethylcyclohexyl methacrylate (Formula 11), 20 parts by weight of carboxylated BPA dimethacrylate (Formula 13), 10 parts by weight of itaconic acid (Formula 24), and 3 parts by weight of Irgacure 819 (radical initiator), and agitating the mixture at 60° C. for 4 hours.

Manufacturing Example 6

Adhesive Composition E

Adhesive composition E was prepared by mixing 67 parts by weight of 2-hydroxyethyl acrylate (Formula 2), 30 parts by weight of 2,5-bis((2-(acryloyloxy)ethoxy)carbonyl)terephthalic acid (Formula 16), 10 parts by weight of itaconic acid (Formula 24), and 3 parts by weight of Irgacure 819 (radical initiator), and agitating the mixture at 60° C. for 4 hours.

Manufacturing Example 7

Adhesive Composition F

Adhesive composition F was prepared by mixing 67 parts by weight of 2-hydroxyethyl acrylate (Formula 2), 30 parts by weight of 4-((2-(acryloyloxy)ethoxy)carbonyl)isophthalic acid (Formula 17), 10 parts by weight of itaconic acid (Formula 24), and 3 parts by weight of Irgacure 819 (radical initiator), and agitating the mixture at 60° C. for 4 hours.

Manufacturing Example 8

Adhesive Composition G

Adhesive composition G was prepared by: putting together 60 parts by weight of 2-hydroxyethyl acrylate (Formula 2), 4.3 parts by weight of ethylene glycol monovinyl ether (Formula 9), 5.7 parts by weight of maleic acid (Formula 25), and 30 parts by weight of 4,4'-(((propane-2,2-diylbis(4,1-phenylene))bis(oxy))bis(1-(methacryloyloxy)propane-3,2-diyl))bis(oxy))bis(4-oxobutanoic acid) (Formula 12); mixing 3 parts by weight of phenylbis(2,4,6-trimethylbensoyl)-phosphine oxide (radical initiator)

Manufacturing Example 9

Adhesive Composition H

Adhesive composition H was prepared by: mixing 60 parts by weight of 2-hydroxyethyl acrylate (Formula 2), 4.3 parts by weight of ethylene glycol monovinyl ether (Formula 9), 5.7 parts by weight of maleic acid (Formula 25), and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing parts by weight of phenylbis(2,4,6-trimethylbensoyl)-phosphine oxide (radical initiator) and 5 parts by weight of diphenyl(4-phenylthio)phenylsulfonium hexafluorophosphate (cationic initiator) together with 100 parts by weight of the resins; and agitating the mixture at 60° C. for 4 hours.

Manufacturing Example 10

Adhesive Composition I

Adhesive composition I was prepared by: putting together 60 parts by weight of 4-hydroxybutyl acrylate (Formula 6), 4.3 parts by weight of ethylene glycol monovinyl ether (Formula 9), 5.7 parts by weight of maleic acid (Formula 25), and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing 3 parts by weight of phenylbis(2,4,6-trimethylbensoyl)-phosphine oxide (radical initiator) together with 100 parts by weight of the resins; and agitating the mixture at 60° C. for 4 hours.

Manufacturing Example 11

Adhesive Composition J

Adhesive composition J was prepared by: putting together 60 parts by weight of 4-hydroxybutyl acrylate (Formula 6), 4.3 parts by weight of ethylene glycol monovinyl ether (Formula 9), 5.7 parts by weight of maleic acid (Formula 25), and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing 3 parts by weight of phenylbis(2,4,6-trimethylbensoyl)-phosphine oxide (radical initiator) and 5 parts by weight of diphenyl(4-phenylthio)phenylsulfonium hexafluorophosphate (cationic initiator) together with 100 parts by weight of the resins; and agitating the mixture at 60° C. for 4 hours.

Manufacturing Example 12

Adhesive Composition K

Adhesive composition K was prepared by: putting together 60 parts by weight of 2-hydroxypropyl acrylate (Formula 4), 4.3 parts by weight of ethylene glycol monovinyl ether (Formula 9), 5.7 parts by weight of maleic acid (Formula 25), and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing 3 parts by weight of phenylbis(2,4,6-trimethylbensoyl)-phosphine oxide (radical initiator) together with 100 parts by weight of the resins; and agitating the mixture at 60° C. for 4 hours.

Manufacturing Example 13

Adhesive Composition L

A composition L was prepared by: putting together 60 parts by weight of 2-hydroxypropyl acrylate (Formula 4), 4.3 parts by weight of ethylene glycol monovinyl ether (Formula 9), 5.7 parts by weight of maleic acid (Formula 25), and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing 3 parts by weight of phenylbis(2,4,6-trimethylbensoyl)-phosphine oxide (radical initiator) and 5 parts by weight of diphenyl(4-phenylthio)phenylsulfonium hexafluorophosphate (cationic initiator) together with 100 parts by weight of the resins; and agitating the mixture at 60° C. for 4 hours.

Manufacturing Example 14

Adhesive Composition M

Adhesive composition M for was prepared by: putting together 60 parts by weight of 2-hydroxyethyl acrylate (Formula 2), 4.3 parts by weight of ethylene glycol monovinyl ether (Formula 9), 5.7 parts by weight of fumaric acid (Formula 26), and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing 3 parts by weight of phenylbis(2,4,6-trimethylbensoyl)-phosphine oxide (radical initiator) together with 100 parts by weight of the resins; and agitating the mixture at 60° C. for 4 hours.

Manufacturing Example 15

Adhesive Composition N

Adhesive composition N was prepared by: mixing 60 parts by weight of 2-hydroxyethyl acrylate (Formula 2), 4.3 parts by weight of ethylene glycol monovinyl ether (Formula 9), 5.7 parts by weight of fumaric acid (Formula 26), and parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing parts by weight of phenylbis(2,4,6-trimethylbensoyl)-phosphine oxide (radical initiator) and 5 parts by weight of diphenyl(4-phenylthio)phenylsulfonium hexafluorophosphate (cationic initiator) together with 100 parts by weight of the resins; and agitating the mixture 60° C. for 4 hours.

Manufacturing Example 16

Adhesive Composition O

Adhesive composition O was prepared by: mixing 60 parts by weight of 2-hydroxyethylacrylate (Formula 2), 5 parts by weight of 1,4-butanolvinylether (Formula 10), 5 parts by weight of maleic acid (Formula 25), and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing parts by weight of phenylbis(2,4,6-trimethylbensoyl)-phosphine oxide (radical initiator) together with 100 parts by weight of the resins; and agitating the mixture at 60° C. for 4 hours.

Manufacturing Example 17

Adhesive Composition P

Adhesive composition P was prepared by: mixing 60 parts by weight of 2-hydroxyethyl acrylate (Formula 2), 5 parts by weight of 1,4-butanolvinylether (Formula 10), 5 parts by weight of maleic acid (Formula 25), and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing parts by weight of phenylbis(2,4,6-trimethylbensoyl)-phosphine oxide (radical initiator) and 5 parts by weight of diphenyl(4-phenylthio)phenylsulfonium hexafluorophosphate (cationic initiator) together with 100 parts by weight of the resins; and agitating the mixture at 60° C. for 4 hours.

Manufacturing Example 18

Adhesive Composition Q

Adhesive composition Q was prepared by: mixing 60 parts by weight of 2-hydroxyethyl acrylate (Formula 2), 4.3 parts by weight of ethylene glycol monovinyl ether (Formula 9), 5.7 parts by weight of maleic acid (Formula 25), and 30 parts by weight of 6,6'-(((((propane-2,2-diylbis(4,1-phenylene))bis(oxy))bis(1-(acryloyloxy)propane-3,2-diyl))bis(oxy))bis(carbonyl))bis(cyclohex-3-enecarboxylic acid) (Formula 19); mixing 3 parts by weight of phenylbis(2,4,6-trimethylbensoyl)-phosphine oxide (radical initiator) together with 100 parts by weight of the resins; and agitating the mixture 60° C. for 4 hours.

Manufacturing Example 19

Adhesive Composition R

Adhesive composition R was prepared by: mixing 60 parts by weight of 2-hydroxyethyl acrylate (Formula 2), 4.3 parts by weight of ethylene glycol monovinyl ether (Formula 9), 5.7 parts by weight of maleic acid (Formula 25), and 30 parts by weight of 6,6'-(((((propane-2,2-diylbis(4,1-phenylene))bis(oxy))bis(1-(acryloyloxy)propane-3,2-diyl))bis(oxy))bis(carbonyl))bis(cyclohex-3-enecarboxylic acid) (Formula 19); mixing 3 parts by weight of phenylbis(2,4,6-trimethylbensoyl)-phosphine oxide (radical initiator) and 5 parts by weight of diphenyl(4-phenylthio)phenylsulfonium hexafluorophosphate (cationic initiator) together with 100 parts by weight of the resins; and agitating the mixture 60° C. for 4 hours.

Comparative Manufacturing Example 1

Adhesive Composition S

Adhesive composition S was prepared by mixing 67 parts by weight of 2-hydroxylethyl acrylate (Formula 2), 30 parts by weight of tris(2-hydroxyethyl)isocyanurate triacrylate, and 3 parts by weight of Irgacure 819 (radical initiator), and agitating the mixture at 60° C. for 4 hours.

Comparative Manufacturing Example 2

Adhesive Composition T

Adhesive composition T was prepared by mixing 67 parts by weight of 2-hydroxylethyl acrylate (Formula 2), 30 parts by weight of dipropylene glycol diacrylate, and 3 parts by weight of Irgacure 819 (radical initiator), and agitating the mixture at 60° C. for 4 hours.

Example 1

Adhesive composition A prepared in Manufacturing Example 2 was applied to the acrylic protective film manufactured in Manufacturing Example 1 by using a pipette. Then, the acrylic protective film was attached to both surfaces of a PVA device, and the PVA device was passed through a laminator under conditions allowing the final thickness of each adhesive layer would be within 1 μm to 2 μm. Thereafter, ultraviolet rays were emitted toward sides to which the acrylic protective film was attached, by using a UV radiation device (a D-bulb fusion lamp) at an intensity of 900 mJ/cm$^2$. In this manner, a polarizing plate was manufactured. The polarizing plate was manufactured at a constant temperature of 20° C. and a constant humidity of 50%.

Example 2

A polarizing plate was manufactured in the same manner as in Example 1 except that adhesive composition B prepared in Manufacturing Example 3 was used instead of adhesive composition A.

Example 3

A polarizing plate was manufactured in the same manner as in Example 1 except that adhesive composition C prepared in Manufacturing Example 4 was used instead of adhesive composition A.

Example 4

A polarizing plate was manufactured in the same manner as in Example 1 except that adhesive composition D prepared in Manufacturing Example 5 was used instead of adhesive composition A.

Example 5

A polarizing plate was manufactured in the same manner as in Example 1 except that adhesive composition E prepared in Manufacturing Example 6 was used instead of adhesive composition A.

Example 6

A polarizing plate was manufactured in the same manner as in Example 1 except that adhesive composition F prepared in Manufacturing Example 7 was used instead of adhesive composition A.

Example 7

A polarizing plate was manufactured in the same manner as in Example 1 except that adhesive composition G prepared in Manufacturing Example 8 was used instead of adhesive composition A.

Example 8

A polarizing plate was manufactured in the same manner as in Example 1 except that adhesive composition H prepared in Manufacturing Example 9 was used instead of adhesive composition A.

Example 9

A polarizing plate was manufactured in the same manner as in Example 1 except that adhesive composition I prepared in Manufacturing Example 10 was used instead of adhesive composition A.

Example 10

A polarizing plate was manufactured in the same manner as in Example 1 except that adhesive composition J prepared in Manufacturing Example 11 was used instead of adhesive composition A.

Example 11

A polarizing plate was manufactured in the same manner as in Example 1 except that adhesive composition K prepared in Manufacturing Example 12 was used instead of adhesive composition A.

Example 12

A polarizing plate was manufactured in the same manner as in Example 1 except that adhesive composition L prepared in Manufacturing Example 13 was used instead of adhesive composition A.

Example 13

A polarizing plate was manufactured in the same manner as in Example 1 except that adhesive composition M prepared in Manufacturing Example 14 was used instead of adhesive composition A.

Example 14

A polarizing plate was manufactured in the same manner as in Example 1 except that adhesive composition N prepared in Manufacturing Example 15 was used instead of adhesive composition A.

Example 15

A polarizing plate was manufactured in the same manner as in Example 1 except that adhesive composition O prepared in Manufacturing Example 16 was used instead of adhesive composition A.

Example 16

A polarizing plate was manufactured in the same manner as in Example 1 except that adhesive composition P prepared in Manufacturing Example 17 was used instead of adhesive composition A.

Example 17

A polarizing plate was manufactured in the same manner as in Example 1 except that adhesive composition Q prepared in Manufacturing Example 18 was used instead of adhesive composition A.

Example 18

A polarizing plate was manufactured in the same manner as in Example 1 except that adhesive composition R prepared in Manufacturing Example 19 was used instead of adhesive composition A.

Comparative Example 1

A polarizing plate was manufactured in the same manner as in Example 1 except that adhesive composition S prepared in Comparative Manufacturing Example 1 was used instead of adhesive composition A.

Comparative Example 2

A polarizing plate was manufactured in the same manner as in Example 1 except that adhesive composition T prepared in Comparative Manufacturing Example 2 was used instead of adhesive composition A.

Experimental Example 1

Adhesiveness Test

The polarizing plates manufactured in Examples 1 to 18 and Comparative Examples 1 and 2 were maintained at a temperature of 20° C. at 70% relative humidity for four days, and then a stripping test was performed. The stripping test was performed on 20 mm wide×100 mm long pieces of the polarizing plates with a stripping speed of 300 mm/min and a stripping angle of 90 degrees so as to measure stripping forces. Measurement results are shown in Table 1 below, in which a stripping force of 3.0 N/cm or greater is denoted as exceptional, 2.0 N/cm to less than 3.0 N/cm as excellent, 1.0 N/cm to less than 2.0 N/cm as good, and 0.5 N/cm to less than 1.0 N/cm as poor.

TABLE 1

| NO. | Adhesive compositions | Adhesiveness |
| --- | --- | --- |
| Example 1 | A | Excellent |
| Example 2 | B | Good |
| Example 3 | C | Good |
| Example 4 | D | Good |
| Example 5 | E | Good |
| Example 6 | F | Excellent |
| Example 7 | G | Exceptional |
| Example 8 | H | Excellent |
| Example 9 | I | Excellent |
| Example 10 | J | Excellent |
| Example 11 | K | Excellent |
| Example 12 | L | Excellent |

TABLE 1-continued

| NO. | Adhesive compositions | Adhesiveness |
|---|---|---|
| Example 13 | M | Good |
| Example 14 | N | Good |
| Example 15 | O | Good |
| Example 16 | P | Good |
| Example 17 | Q | Good |
| Example 18 | R | Good |
| Comparative Example 1 | S | Poor |
| Comparative Example 2 | T | Poor |

While exemplary embodiments have been shown and described above, it will be apparent to those skilled in the art that modifications and variations could be made without departing from the spirit and scope of the present disclosure as defined by the appended claims.

The invention claimed is:

1. A radically curable adhesive composition comprising, based on 100 parts by weight thereof,
   40 to 80 parts by weight of a first compound represented by the following Formula 1;
   15 to 50 parts by weight of a second compound comprising at least one carboxy group; and
   0.5 to 10 parts by weight of a radical initiator,

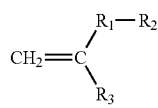

[Formula 1]

where $R_1$ is an ester group or an ether group,
$R_2$ is a $C_{1-10}$ alkyl group comprising at least one hydroxy substituent or a $C_{4-10}$ cycloalkyl group comprising at least one hydroxy substituent, and
$R_3$ is hydrogen or a $C_{1-10}$ alkyl group.

2. The radically curable adhesive composition of claim 1, wherein the radically curable adhesive composition comprises 50 to 70 parts by weight of the first compound, 20 to 40 parts by weight of the second compound, and 0.5 to 10 parts by weight of the radical initiator, based on 100 parts by weight the radically curable adhesive composition.

3. The radically curable adhesive composition of claim 1, further comprising, as a third compound, an acrylic monomer having a ring structure with a carbon number of 7 to 20.

4. The radically curable adhesive composition of claim 3, wherein the radically curable adhesive composition comprises 40 to 80 parts by weight of the first compound, 15 to 50 parts by weight of the second compound, 1 to 50 parts by weight of the third compound, and 0.5 to 10 parts by weight of the radical initiator, based on 100 parts by weight the radically curable adhesive composition.

5. The radically curable adhesive composition of claim 1, wherein the first compound comprises at least one selected from the group consisting of compounds represented by the following Formulas 2 to 11:

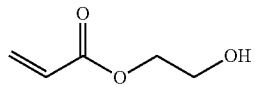

[Formula 2]

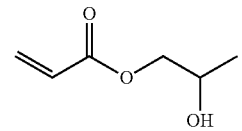

[Formula 3]

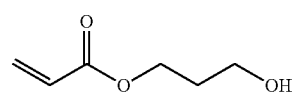

[Formula 4]

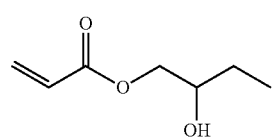

[Formula 5]

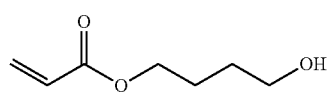

[Formula 6]

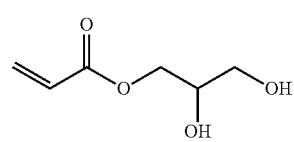

[Formula 7]

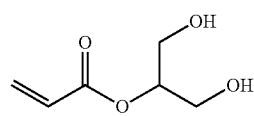

[Formula 8]

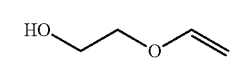

[Formula 9]

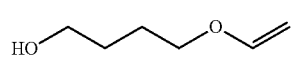

[Formula 10]

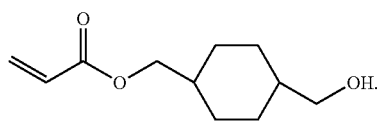

[Formula 11]

6. The radically curable adhesive composition of claim 1, wherein the second compound has an acidity of 100 to 1,000 KOH mg/g.

7. The radically curable adhesive composition of claim 1, wherein the second compound comprises at least one selected from the group consisting of compounds represented by the following Formulas 12 to 26:

[Formula 12]
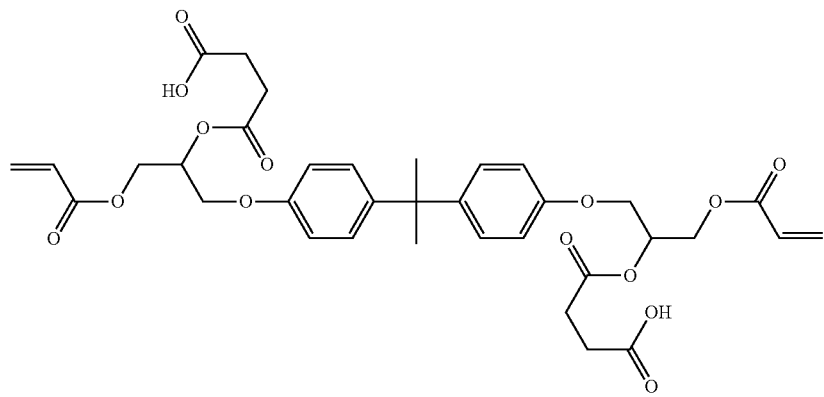
[Formula 13]
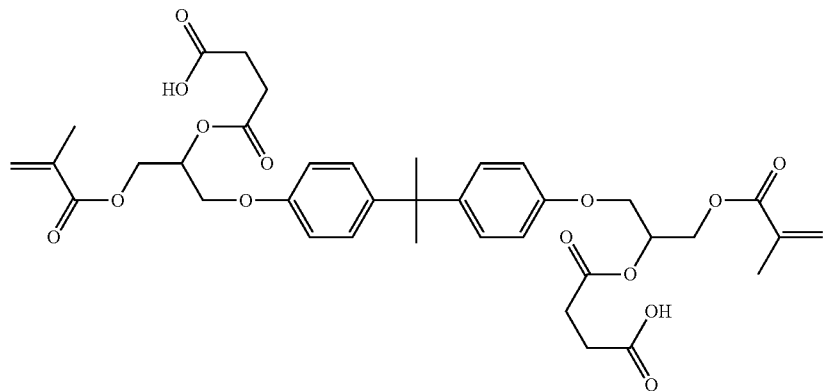
[Formula 14]
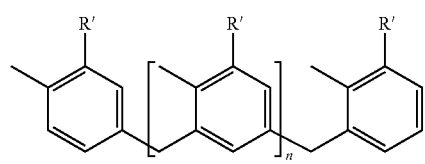
where R' is
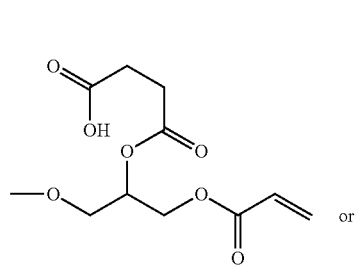
or
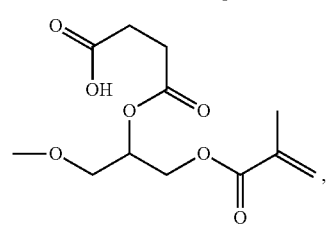
[Formula 15]
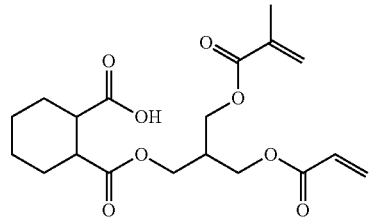
[Formula 16]
and n is an integer ranging from 1 to 5

[Formula 17]
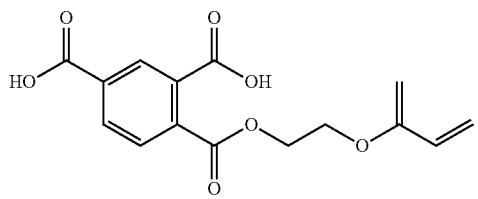

[Formula 18]
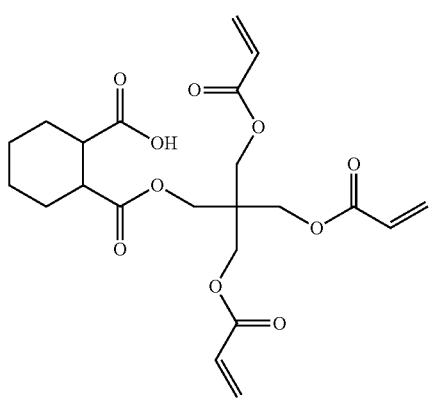

[Formula 19]
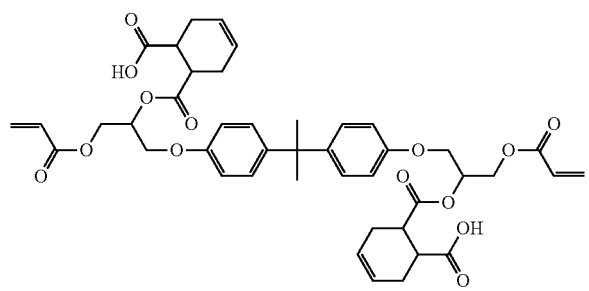

[Formula 20]
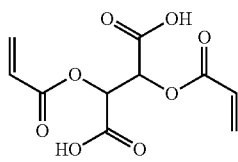

[Formula 21]
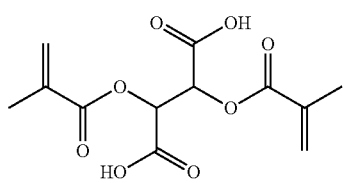

[Formula 22]
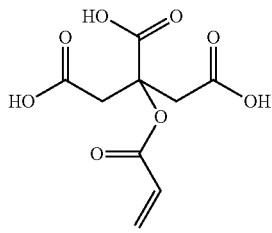

[Formula 23]
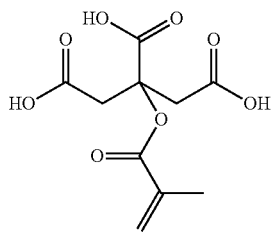

[Formula 24]
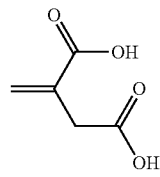

[Formula 25]

[Formula 26]
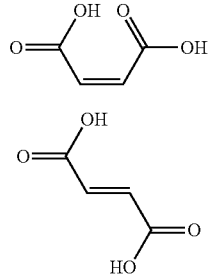

8. The radically curable adhesive composition of claim 3, wherein the third compound comprises at least one selected from the group consisting of isobornyl (meth)acrylate, norbornyl (meth)acrylate, dicyclopentanyl (meth)acrylate, dicyclopentenyl (meth)acrylate), and 1-adamantyl-(meth)acrylate.

9. The radically curable adhesive composition of claim 1, further comprising a cationic initiator.

10. The radically curable adhesive composition of claim 9, wherein the cationic initiator is included in an amount of 0.1 to 10 parts by weight based on 100 parts by weight of the radically curable adhesive composition.

11. The radically curable adhesive composition of claim 9, wherein the cationic initiator comprises at least one selected from the group consisting of hexafluoroantimonate, diphenyl(4-phenylthio)phenylsulfonium hexafluorophosphate, (phenyl)[4-(2-methylpropyl) phenyl]-iodonium hexafluorophosphate, (thiodi-4,1-phenylene)bis(diphenylsulfonium) dihexafluoroantimonate, and (thiodi-4,1-phenylene)bis(diphenylsulfonium)dihexafluorophosphate.

12. The radically curable adhesive composition of claim 1, wherein the radically curable adhesive composition has an acidity of 30 to 300 mg KOH/g.

13. The radically curable adhesive composition of claim 1, wherein the radically curable adhesive composition has a glass transition temperature of 70° C. or higher.

14. The radically curable adhesive composition of claim 1, wherein the radically curable adhesive composition has a viscosity of 10 to 300 cP.

15. A polarizing plate comprising:
a polarizer;
an adhesive layer formed on at least one surface of the polarizer; and
an acrylic protective film formed on the adhesive layer,
wherein the adhesive layer is formed of the radically curable adhesive composition of claim 1.

* * * * *